United States Patent
Yasuda et al.

(10) Patent No.: US 12,391,375 B2
(45) Date of Patent: Aug. 19, 2025

(54) BLADE AND ROTOR

(71) Applicant: HONDA MOTOR CO., LTD., Tokyo (JP)

(72) Inventors: Takaaki Yasuda, Wako (JP); Susumu Mashio, Wako (JP); Masahiko Asanuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/476,683

(22) Filed: Sep. 28, 2023

(65) Prior Publication Data
US 2024/0109652 A1    Apr. 4, 2024

(30) Foreign Application Priority Data

Sep. 30, 2022  (JP) ................. 2022-158046

(51) Int. Cl.
| | |
|---|---|
| *B64C 27/473* | (2006.01) |
| *B64C 27/467* | (2006.01) |
| *B64C 29/00* | (2006.01) |
| *F01D 5/02* | (2006.01) |
| *F01D 5/14* | (2006.01) |

(52) U.S. Cl.
CPC .......... *B64C 27/467* (2013.01); *B64C 27/473* (2013.01); *F01D 5/021* (2013.01); *F01D 5/14* (2013.01); *B64C 29/0008* (2013.01); *F05D 2220/90* (2013.01)

(58) Field of Classification Search
CPC ....... B64C 27/467; B64C 27/473; F01D 5/14; F01D 5/141
See application file for complete search history.

(56) References Cited

U.S. PATENT DOCUMENTS

| | | | | |
|---|---|---|---|---|
| 2,540,404 | A | * | 2/1951 | Neale .................. B64C 27/08 244/17.11 |
| 4,324,530 | A | * | 4/1982 | Fradenburgh ......... B64C 27/463 416/228 |
| 4,451,206 | A | * | 5/1984 | Philippe ................ B64C 27/463 416/228 |
| 4,880,355 | A | * | 11/1989 | Vuillet .................. B64C 27/463 416/228 |
| 5,137,427 | A | * | 8/1992 | Shenoy ................ B64C 27/463 416/223 R |
| 5,332,362 | A | * | 7/1994 | Toulmay ............... B64C 27/463 416/223 R |
| 6,000,911 | A | * | 12/1999 | Toulmay ............... B64C 27/463 416/223 R |

(Continued)

FOREIGN PATENT DOCUMENTS

CN          106564588 A  *  4/2017  ............. B64C 27/04

*Primary Examiner* — Christopher R Legendre
(74) *Attorney, Agent, or Firm* — Rankin, Hill & Clark LLP (57) ABSTRACT

A blade for use in a rotor of an aircraft is swept in a region extending to a blade tip from a first position located between the rotation center of the rotor and the blade tip in a radial direction of the VTOL rotor, the sweep amount increases from the first position toward the blade tip, and the rate of change of the sweep amount in a region extending to the blade tip from a second position located between the first position and the blade tip in the radial direction of the VTOL rotor, is greater than the rate of change of the sweep amount in a region extending from the first position to the second position.

10 Claims, 7 Drawing Sheets

(56) References Cited

U.S. PATENT DOCUMENTS

| | | | |
|---|---|---|---|
| 6,190,132 B1 * | 2/2001 | Yamakawa | B64C 27/46 |
| | | | 416/DIG. 2 |
| 6,231,308 B1 * | 5/2001 | Kondo | B64C 27/463 |
| | | | 416/235 |
| 7,246,998 B2 * | 7/2007 | Kovalsky | B64C 27/473 |
| | | | 416/88 |
| 9,061,758 B2 * | 6/2015 | Schimke | B64C 27/467 |
| 10,414,490 B2 * | 9/2019 | Leusink | B64C 27/473 |
| 10,899,440 B2 | 1/2021 | Sargent et al. | |
| 11,498,671 B2 * | 11/2022 | Pantalone, III | B64C 27/467 |
| 12,116,119 B2 * | 10/2024 | Min | B64C 27/467 |
| 2024/0109652 A1 * | 4/2024 | Yasuda | F01D 5/021 |

* cited by examiner

BLADE AND ROTOR

CROSS-REFERENCE TO RELATED APPLICATIONS

This application is based upon and claims the benefit of priority from Japanese Patent Application No. 2022-158046 filed on Sep. 30, 2022, the contents of which are incorporated herein by reference.

BACKGROUND OF THE INVENTION

Field of the Invention

The present invention relates to a blade and a rotor.

DESCRIPTION OF THE RELATED ART

U.S. Pat. No. 10,899,440 B2 discloses the shape of the rotor blade of a helicopter.

SUMMARY OF THE INVENTION

In the technique disclosed in U.S. Pat. No. 10,899,440 B2, the blade has a sweep angle. Noise can be reduced by providing the sweep angle. However, U.S. Pat. No. 10,899,440 B2 does not consider the energy efficiency of the blade. Therefore, there is room for improvement in the structure of the blade that achieves both improvement in noise and improvement in energy efficiency.

An object of the present invention is to solve the above-mentioned problem.

According to a first aspect of the present invention, there is provided a blade for use in a rotor of an aircraft, wherein the blade is swept in a region of the blade extending to a blade tip from a first position located between a rotation center of the rotor and the blade tip in a radial direction of the rotor, an amount of sweep of the blade increases from the first position toward the blade tip, and a rate of change of the amount of sweep in a region of the blade extending to the blade tip from a second position located between the first position and the blade tip in the radial direction of the rotor is greater than a rate of change of the amount of sweep in a region of the blade extending from the first position to the second position.

According to a second aspect of the present invention, there is provided a rotor comprising the blade according to the first aspect, wherein the blade comprises three or more blades.

According to the present invention, it is possible to provide a blade having a sweep angle set in consideration of noise and energy efficiency, and a rotor including the blade.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

Configuration of Aircraft

Figure 1:
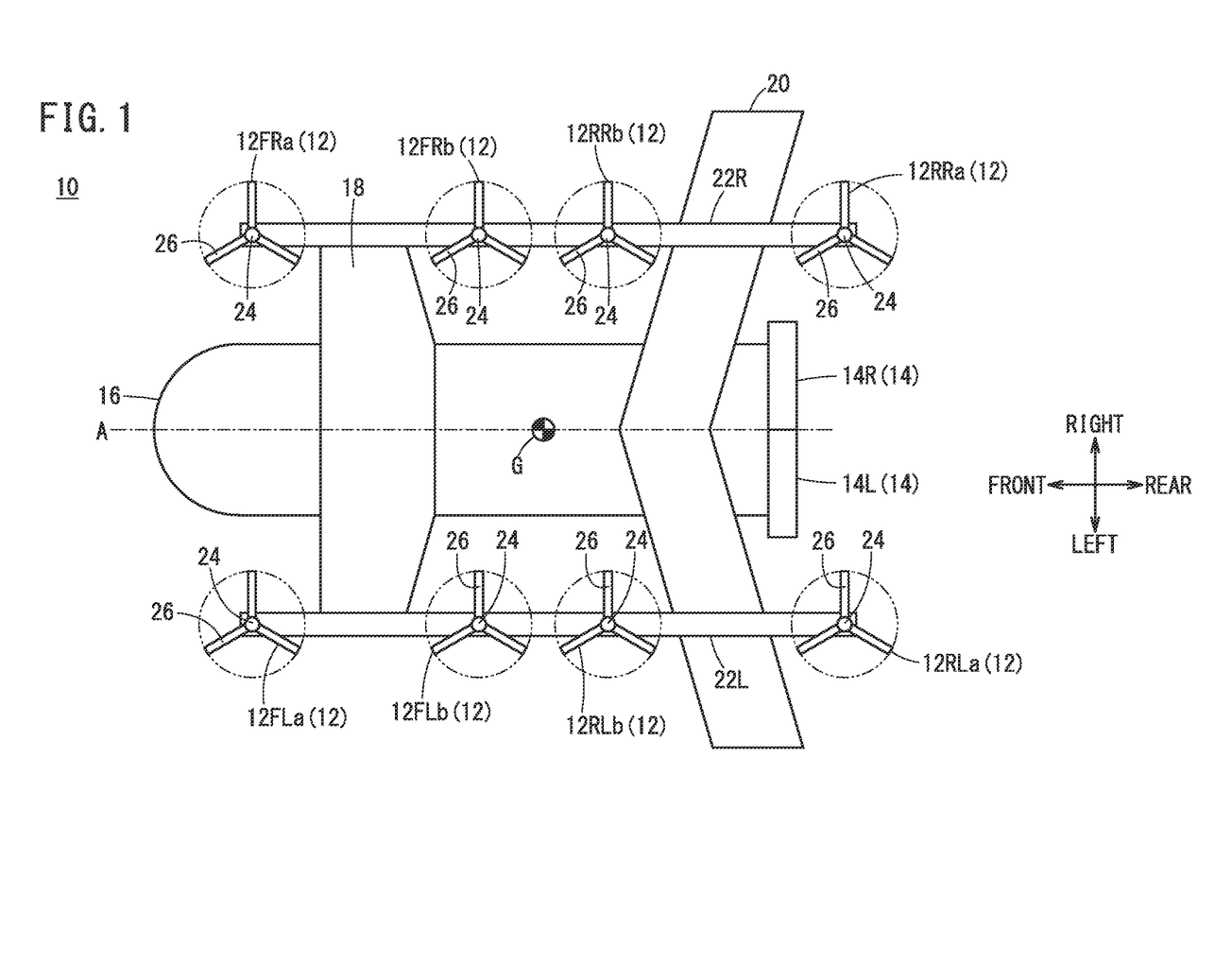
FIG. 1 is a schematic diagram of an aircraft.

FIG. 1 is a schematic view of an aircraft 10. The aircraft 10 of the present embodiment is an electric vertical take-off and landing aircraft (eVTOL aircraft). The aircraft 10 of the present embodiment includes a plurality of VTOL rotors 12 and a plurality of cruise rotors 14. Rotation of the VTOL rotors 12 generates lift for moving a fuselage 16 upward. Rotation of the cruise rotors 14 generates thrust for moving the fuselage 16 forward.

The aircraft 10 includes the fuselage 16. The fuselage 16 is provided with a cockpit, a cabin, and the like. A pilot rides in the cockpit and controls the aircraft 10. Passengers and the like ride in the cabin. The aircraft 10 may be automatically controlled without a pilot aboard.

The aircraft 10 includes a front wing 18 and a rear wing 20, which are fixed wings. The front wing 18 is provided forward of a center of gravity G of the fuselage 16. The rear wing 20 is provided rearward of the center of gravity G of the fuselage 16. In a case where the fuselage 16 has an airspeed, lift is generated in the front wing 18 and the rear wing 20 by controlling the angles of attack of the front wing 18 and the rear wing 20.

The aircraft 10 includes eight VTOL rotors 12. The eight VTOL rotors 12 are a rotor 12FLa, a rotor 12FLb, a rotor 12RLa, a rotor 12RLb, a rotor 12FRa, a rotor 12FRb, a rotor 12RRa, and a rotor 12RRb. Each of the VTOL rotors 12 corresponds to a rotor of the present invention.

The rotor 12FLa, the rotor 12FLb, the rotor 12RLa, and the rotor 12RLb are attached to a boom 22L. The boom 22L extends in the front-rear direction. The rotor 12FLa, the rotor 12FLb, the rotor 12RLa, and the rotor 12RLb are lined up in the front-rear direction of the fuselage 16 of the aircraft 10. The boom 22L is attached to the front wing 18 and the rear wing 20. The boom 22L is provided on the left side of the center of gravity G. That is, the rotor 12FLa, the rotor 12FLb, the rotor 12RLa, and the rotor 12RLb are disposed on the left side of the center of gravity G.

The rotor 12FLa is provided forward of the front wing 18. The rotor 12FLb is provided between the front wing 18 and the center of gravity G in the front-rear direction of the fuselage 16. The rotor 12RLb is provided between the center of gravity G and the rear wing 20 in the front-rear direction of the fuselage 16. The rotor 12RLa is provided rearward of the rear wing 20. The distance from the center of gravity G to the rotor 12FLb is shorter than the distance from the center of gravity G to the rotor 12FLa. The distance from the center of gravity G to the rotor 12RLb is shorter than the distance from the center of gravity G to the rotor 12RLa.

The rotor 12FRa, the rotor 12FRb, the rotor 12RRa, and the rotor 12RRb are attached to a boom 22R. The boom 22R extends in the front-rear direction. The rotor 12FRa, the rotor 12FRb, the rotor 12RRa, and the rotor 12RRb are lined up in the front-rear direction of the fuselage 16 of the aircraft 10. The boom 22R is attached to the front wing 18 and the rear wing 20. The boom 22R is provided on the right side of the center of gravity G. That is, the rotor 12FRa, the rotor 12FRb, the rotor 12RRa, and the rotor 12RRb are disposed on the right side of the center of gravity G.

The rotor 12FRa is provided forward of the front wing 18. The rotor 12FRb is provided between the front wing 18 and the center of gravity G in the front-rear direction of the fuselage 16. The rotor 12RRb is provided between the center of gravity G and the rear wing 20 in the front-rear direction of the fuselage 16. The rotor 12RRa is provided rearward of the rear wing 20. The distance from the center of gravity G to the rotor 12FRb is shorter than the distance from the center of gravity G to the rotor 12FRa. The distance from the center of gravity G to the rotor 12RRb is shorter than the distance from the center of gravity G to the rotor 12RRa.

In FIG. 1, the boom 22L and the boom 22R have a shape linearly extending in the front-rear direction of the fuselage 16. However, the boom 22L and the boom 22R may be formed in an arc shape protruding outward in the left-right direction of the fuselage 16. When the boom 22L is formed in an arc shape protruding outward in the left-right direction of the fuselage 16, the rotor 12FLb is located on the left side (outer side) of the rotor 12FLa in the left-right direction of the fuselage 16. When the boom 22R is formed in an arc shape protruding outward in the left-right direction of the fuselage 16, the rotor 12FRb is located on the right side (outer side) of the rotor 12FRa in the left-right direction of the fuselage 16.

Each VTOL rotor 12 includes a rotation shaft 24. The rotation shaft 24 extends in the up-down direction of the fuselage 16. The rotation shaft 24 may be angled (canted) a few degrees with respect to the up-down direction of the fuselage 16.

Each VTOL rotor 12 includes three blades 26. Each VTOL rotor 12 may include more than three blades 26.

When the VTOL rotor 12 rotates about the rotation shaft 24, lift is generated in the blades 26. The magnitude of the lift generated by the VTOL rotor 12 is controlled by controlling the rotational speed of the VTOL rotor 12 and the pitch of the blades 26. The VTOL rotor 12 rotates and generates lift mainly during vertical take-off, during transition from vertical take-off to cruising, during transition from cruising to vertical landing, during vertical landing, during hovering, and the like. On the other hand, in a state where lift is generated in the front wing 18 and the rear wing 20 during cruising or the like, the rotation of the VTOL rotor 12 is stopped.

The aircraft 10 includes two cruise rotors 14. The two cruise rotors 14 are a rotor 14L and a rotor 14R.

The rotor 14L and the rotor 14R are attached to a rear portion of the fuselage 16. The rotor 14L is disposed on the left side of a center line A of the fuselage 16. The rotor 14R is disposed on the right side of the center line A of the fuselage 16.

A rotation shaft (not shown) of each cruise rotor 14 extends in the front-rear direction of the fuselage 16. The rotation shaft of each cruise rotor 14 may be angled (canted) a few degrees with respect to the front-rear direction. Each cruise rotor 14 includes a plurality of blades (not shown).

When the cruise rotor 14 rotates about the rotation shaft, thrust is generated in the blades. The magnitude of the thrust of the cruise rotor 14 is controlled by controlling the rotational speed thereof and the pitch of the blades. The cruise rotor 14 rotates and generates thrust mainly during transition from vertical take-off to cruising, during cruising, during transition from cruising to vertical landing, and the like.

Shape of Blade

Figure 2:
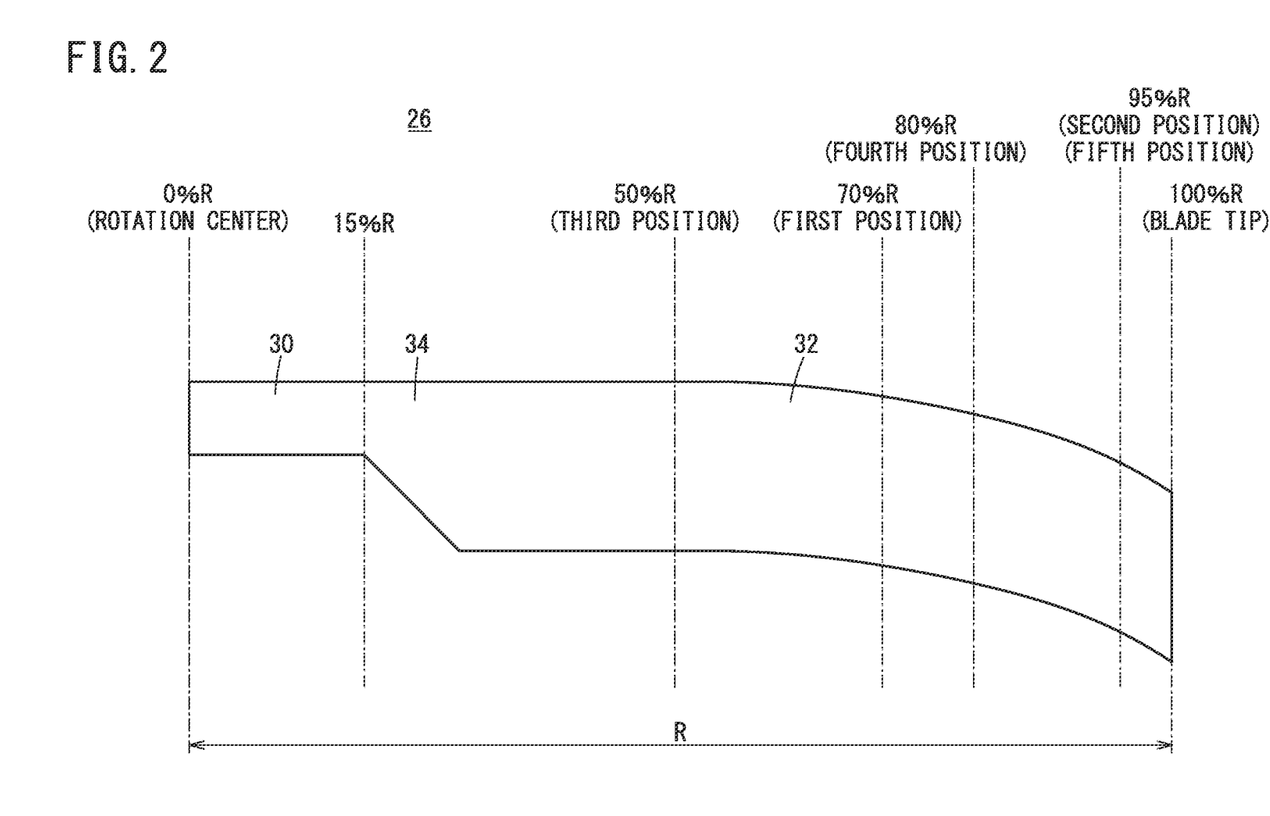
FIG. 2 is a diagram showing a blade.

FIG. 2 is a diagram showing the blade 26. In the present embodiment, the position on the blade 26 in the longitudinal direction thereof is indicated by % R. % R represents the ratio of the length of the blade 26 from a rotation center of the VTOL rotor 12 to the position, to a length R which is the length of the blade 26 from the rotation center to a blade tip. It is assumed that the position of the rotation center of the VTOL rotor 12 is 0% R and the position of the blade tip is 100% R. The longitudinal direction of the blade 26 coincides with a radial direction of the VTOL rotor 12. Hereinafter, the rotation center of the VTOL rotor 12 may be simply referred to as a rotation center.

A blade root section 30 provided to extend from the rotation center (0% R) to 15% R has an elliptical cross-section. In the aircraft 10 according to the present embodiment, the rotation of the VTOL rotor 12 is stopped during cruising or the like. Therefore, when the rotation is stopped, it is required to reduce the air resistance of the blade 26. In addition, the blade root section 30 contributes less than the other sections to the generation of lift during the rotation. Therefore, by forming the cross-section of the blade root section 30 into an elliptical shape, the air resistance when the rotation of the VTOL rotor 12 is stopped is reduced while suppressing a decrease in the energy efficiency when the VTOL rotor 12 rotates.

A blade section 32 is provided closer to the blade tip (100% R) than the blade root section 30 is. The blade section 32 is provided to extend at least from the position of 50% R of the blade 26 to the blade tip (100% R). The blade section 32 may be provided closer to the rotation center (0% R) than the position of 50% R. The blade section 32 has a thin plate-shaped cross-section. A connecting section 34 is provided between the blade root section 30 and the blade section 32. The connecting section 34 is formed in a shape that smoothly connects the blade root section 30 and the blade section 32.

The blade 26 is swept from 70% R to the blade tip (100% R). Hereinafter, the position of 70% R at which the blade 26 starts to be swept may be referred to as a first position. The first position at which the blade 26 is swept is not limited to the position of 70% R but may be any position between 65% R and 75% R. In addition, the twist angle of the blade section 32 of the blade 26 changes at least from the position of 50% R toward the blade tip (100% R). In the blade 26, the twist angle of the entire blade section 32 may change toward the radially outer side of the VTOL rotor 12.

Figure 3:
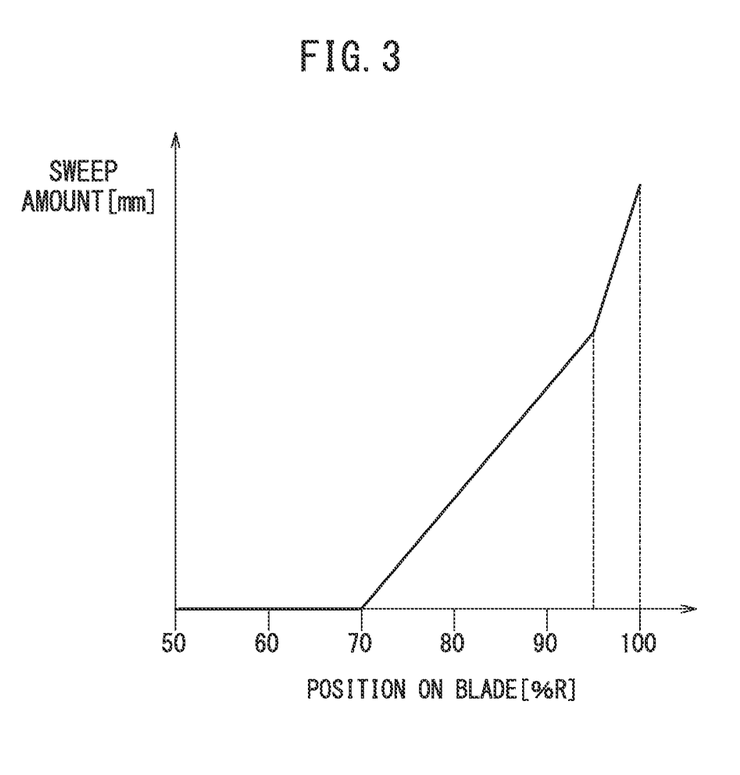
FIG. 3 is a graph showing a sweep amount of the blade with respect to the position on the blade in a longitudinal direction thereof.

FIG. 3 is a graph showing a sweep amount of the blade 26 with respect to the position on the blade 26 in the longitudinal direction. The sweep amount of the blade 26 increases from the first position (70% R) toward the blade tip (100% R).

The rate of change of the sweep amount in the region from 95% R to the blade tip (100% R) is greater than the rate of change of the sweep amount in the region from the first position (70% R) to 95% R. In other words, the sweep angle in the region from 95% R to the blade tip (100% R) is greater than the sweep angle in the region from the first position (70% R) to 95% R. Hereinafter, the position of 95% R at which the rate of change of the sweep amount changes may be referred to as a second position. The second position at which the rate of change of the sweep amount changes is not limited to 95% R but may be in a range from 92.5% R to 97.5% R.

The blade 26 is swept from the first position to the blade tip. As a result, the timing at which the blade tip vortex generated by a blade 26 having passed before collides with the blade section 32 is shifted. As a result, energy loss (aerodynamic loss) and noise at the blade tip section having a high degree of contribution to energy efficiency are reduced while suppressing loss associated with a change in the sweep angle.

The sweep angle of the blade 26 further increases from the second position to the blade tip. As a result, the generation of the blade tip vortex is reduced.

Figure 4:
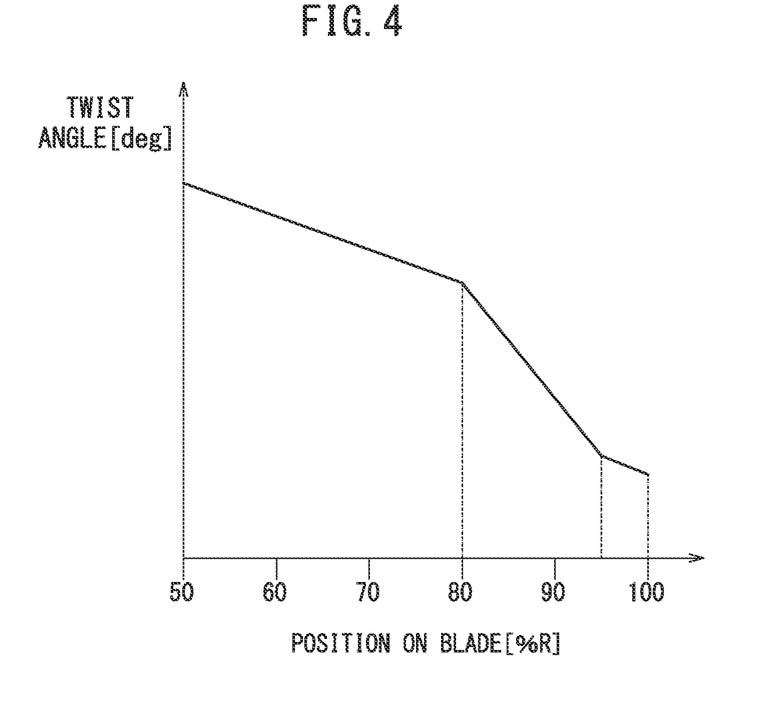
FIG. 4 is a graph showing a twist angle of the blade with respect to the position on the blade in the longitudinal direction.

FIG. 4 is a graph showing a twist angle of the blade 26 with respect to the position on the blade 26 in the longitudinal direction. The twist angle of the blade 26 decreases from 35% R toward the blade tip (100% R).

The rate of change of the twist angle at least in the region from 50% R to 80% R is smaller than the rate of change of the twist angle in the region from 80% R to 95% R. The rate of change of the twist angle in the region from 35% R to 80% R may be smaller than the rate of change of the twist angle in the region from 80% R to 95% R. Hereinafter, the position of 50% R may be referred to as a third position. The position of 80% R at which the rate of change of the twist angle of the blade 26 changes may be referred to as a fourth position. The fourth position at which the rate of change of the twist angle of the blade 26 changes is not limited to the position of 80% R but may be in a range from 75% R to 85% R.

The rate of change of the twist angle in the region from the fourth position (80% R) to 95% R is greater than the rate of change of the twist angle in the region from 95% R to the blade tip (100% R). Hereinafter, the position of 95% R at which the rate of change of the twist angle of the blade 26 changes may be referred to as a fifth position. The fifth position is the same as the second position at which the rate of change of the sweep amount of the blade 26 changes. The fifth position and the second position may be slightly shifted from each other. In addition, the fifth position at which the rate of change of the twist angle of the blade 26 changes is not limited to the position of 95% R, but may be in a range from 92.5% R to 97.5% R.

The twist of the blade 26 increases from the fourth position to the fifth position, and decreases from the fifth position to the blade tip. As a result, the influence of the blade tip vortex generated from the blade 26 on a blade 26 passing next is reduced. This improves the energy efficiency of the VTOL rotor 12.

As shown in FIG. 2, the distance between the rotation center (0% R) and the fourth position (80% R) is longer than the distance between the fourth position (80% R) and the blade tip (100% R). The distance between the fourth position (80% R) and the blade tip (100% R) is longer than the distance between the fifth position (95% R) and the blade tip (100% R). The distance between the rotation center (0% R) and the fourth position (80% R) is longer than the distance between the fourth position (80% R) and the blade tip (100% R). The distance between the fourth position (80% R) and the blade tip (100% R) is longer than the distance between the fifth position (95% R) and the blade tip (100% R). The distance between the rotation center (0% R) and the first position (70% R) is shorter than the distance between the rotation center (0% R) and the fourth position (80% R). The distance between the rotation center (0% R) and the first position (70% R) is longer than the distance between the first position (70% R) and the blade tip (100% R).

Advantageous Effects

The blade 26 of the present embodiment is swept in the region from the first position (70% R), which is a position between the center of rotation and the blade tip in the radial direction of the VTOL rotor 12, to the blade tip (100% R). In the blade 26, the sweep angle in the region from the second position (95% R) to the blade tip (100% R) is greater than the sweep angle in the region from the first position (70% R) to the second position (95% R). That is, the sweep angle of the blade 26 of the present embodiment increases in the blade tip section.

Figure 5:
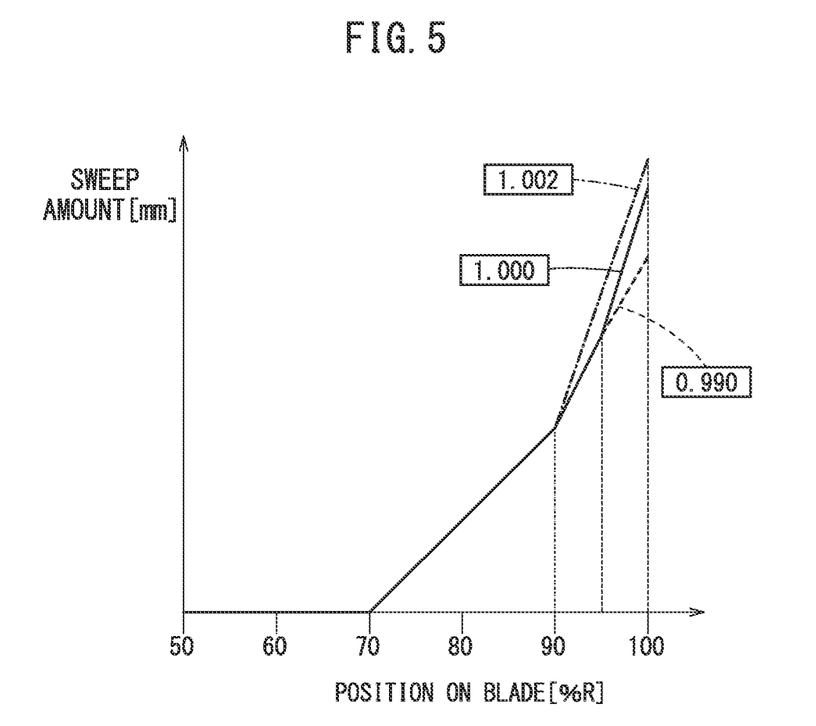
FIG. 5 is a diagram showing a simulation result of energy efficiency in a case where a position at which a sweep angle increases in a blade tip section is changed.

FIG. 5 is a diagram showing a simulation result of energy efficiency in a case where a position (the second position) at which the sweep angle increases is changed in the blade tip section. The solid line indicates the sweep amount with respect to the position on the blade 26 in the longitudinal direction in a case where the sweep angle increases at 95% R as in the present embodiment. The dotted line indicates the sweep amount with respect to the position on the blade 26 in the longitudinal direction in a case where the sweep angle does not increase in the blade tip section. The alternate long and short dash line indicates the sweep amount with respect to the position on the blade 26 in the longitudinal direction in a case where the sweep angle increases at 90% R.

The numbers in the square frames in FIG. 5 each indicate the energy efficiency when the energy efficiency of the VTOL rotor 12 obtained using the blade 26 of the present embodiment is set to "1.000".

As shown in FIG. 5, the energy efficiency in the case where the sweep angle increases in the blade tip section (the solid line, the alternate long and short dash line) becomes higher than the energy efficiency in the case where the sweep angle does not increase in the blade tip section (the dotted line). That is, by increasing the sweep angle of the blade tip section of the blade 26, the energy efficiency of the VTOL rotor 12 can be improved.

In the blade 26 of the present embodiment, the twist increases at the fourth position (80% R) and the twist decreases at the fifth position (95% R). The fifth position (95% R) is substantially the same position as the second position (95% R) at which the sweep angle increases in the blade tip section.

Figure 6:
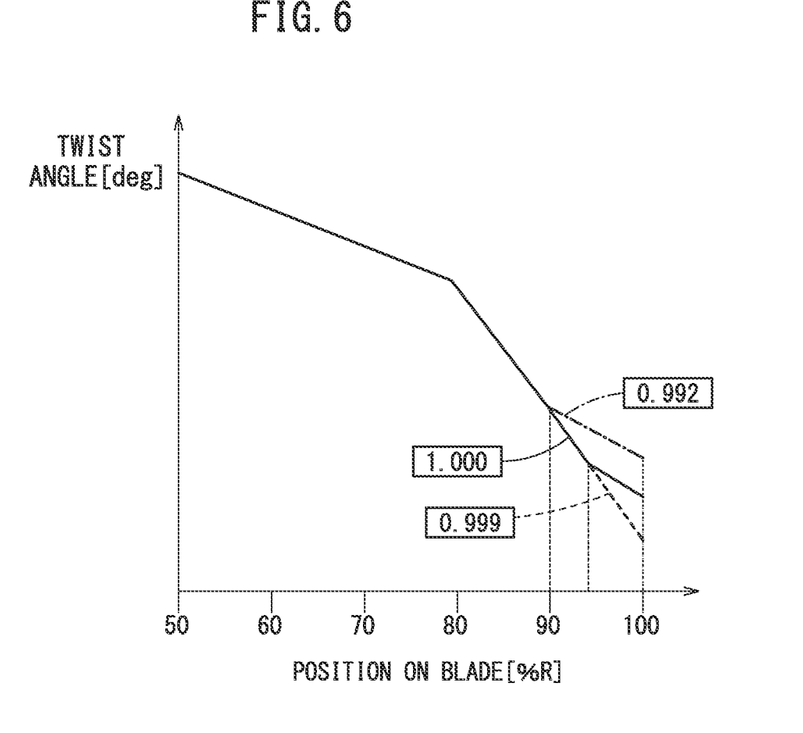
FIG. 6 is a diagram showing a simulation result of energy efficiency in a case where a position at which the twist of the blade decreases is changed.

FIG. 6 is a diagram showing a simulation result of energy efficiency in a case where a position (the fifth position) at which the twist of the blade 26 decreases is changed. The solid line indicates the twist angle of the blade 26 with respect to the position on the blade 26 in the longitudinal direction in a case where the twist of the blade 26 decreases at 95% R as in the present embodiment. The dotted line indicates the twist angle of the blade 26 with respect to the position on the blade 26 in the longitudinal direction in a case where the twist of the blade 26 does not decrease in the blade tip section. The alternate long and short dash line indicates the twist angle of the blade 26 with respect to the position on the blade 26 in the longitudinal direction in a case where the twist of the blade 26 decreases at 90% R.

The numbers in the square frames in FIG. 6 each indicate the energy efficiency when the energy efficiency of the VTOL rotor 12 obtained using the blade 26 of the present embodiment is set to "1.000".

As shown in FIG. 6, the energy efficiency in the case where the twist of the blade 26 decreases at 95% R (the solid line) becomes higher than the energy efficiency in the case where the twist of the blade 26 does not decrease in the blade tip section (the dotted line). Further, the energy efficiency in the case where the twist of the blade 26 decreases at 95% R (the solid line) becomes higher than the energy efficiency in the case where the twist of the blade 26 decreases at 90% R (the alternate long and short dash line). That is, the energy efficiency of the VTOL rotor 12 can be improved by decreasing the twist of the blade 26 at substantially the same position as the position at which the sweep angle increases in the blade tip section.

In the blade 26 of the present embodiment, the first position (70% R) at which the blade 26 starts to be swept is located closer to the rotation center (0% R) than is the fourth position (80% R) at which the twist of the blade 26 increases.

Figure 7:
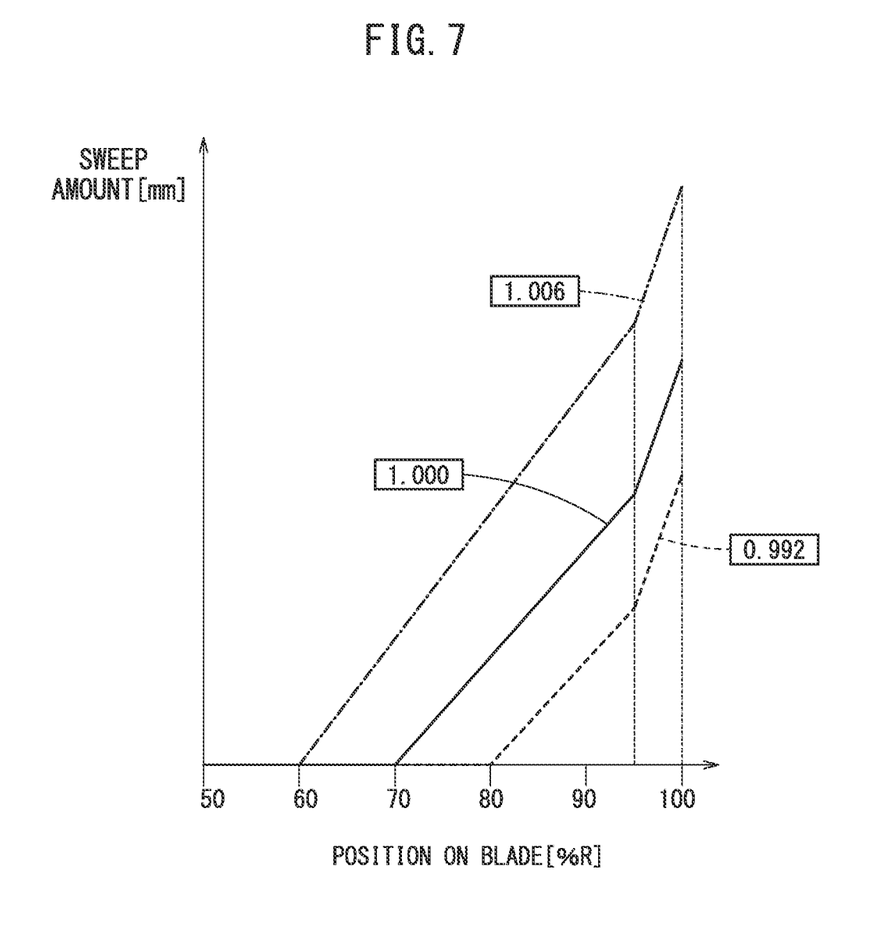
FIG. 7 is a diagram showing a simulation result of energy efficiency in a case where a position at which the blade starts to be swept is changed.

FIG. 7 is a diagram showing a simulation result of energy efficiency in a case where a position (the first position) at which the blade 26 starts to be swept is changed. The solid line indicates the sweep amount of the blade 26 with respect to the position on the blade 26 in the longitudinal direction in a case where the blade 26 starts to be swept at 70% R as in the present embodiment. The dotted line indicates the sweep amount of the blade 26 with respect to the position on the blade 26 in the longitudinal direction in a case where the blade 26 starts to be swept at 80% R which is the same as the fourth position. The alternate long and short dash line indicates the sweep amount of the blade 26 with respect to the position on the blade 26 in the longitudinal direction in a case where the blade 26 starts to be swept at 60% R.

The numbers in the square frames in FIG. 7 each indicate the energy efficiency when the energy efficiency of the VTOL rotor 12 obtained using the blade 26 of the present embodiment is set to "1.000".

As shown in FIG. 7, the energy efficiency in the case where the blade 26 starts to be swept at the position closer to the rotation center (0% R) than is the fourth position (80% R) (the solid line, the alternate long and short dash line) becomes higher than the energy efficiency in the case where the blade 26 starts to be swept at the same position as the fourth position (the dotted line). That is, the energy efficiency of the VTOL rotor 12 can be improved by the first position (70% R) at which the blade 26 starts to be swept being located closer to the rotation center (0% R) than is the fourth position (80% R) at which the twist of the blade 26 increases.

Invention Obtained from Embodiment

The inventions that can be grasped from the above embodiment will be described below.

Provided is the blade (26) for use in the rotor (12) of the aircraft (10), wherein the blade is swept in a region of the blade extending to a blade tip from a first position located between a rotation center of the rotor and the blade tip in a radial direction of the rotor, an amount of sweep of the blade increases from the first position toward the blade tip, and a rate of change of the amount of sweep in a region of the blade extending to the blade tip from a second position located between the first position and the blade tip in the radial direction of the rotor is greater than a rate of change of the amount of sweep in a region of the blade extending from the first position to the second position. According to this feature, the energy efficiency of the rotor can be improved.

In the above blade, a twist angle of the blade may change at least from a third position toward the blade tip, the third position being located at a center between the rotation center of the rotor and the blade tip in the radial direction of the rotor, a rate of change of the twist angle in a region of the blade extending from a fourth position located between the rotation center of the rotor and the blade tip in the radial direction of the rotor, to a fifth position located between the rotation center of the rotor and the blade tip in the radial direction of the rotor, may be greater than a rate of change of the twist angle in a region of the blade extending from the fifth position to the blade tip, a distance between the rotation center of the rotor and the fourth position may be longer than a distance between the fourth position and the blade tip, the distance between the fourth position and the blade tip may be longer than a distance between the fifth position and the blade tip, and the fifth position may be substantially a same position as the second position. According to this feature, the energy efficiency of the rotor can be improved.

In the above blade, a twist angle of the blade may change at least from a third position toward the blade tip, the third position being located at a center between the rotation center of the rotor and the blade tip in the radial direction of the rotor, a rate of change of the twist angle in a region of the blade extending from the third position to a fourth position located between the rotation center of the rotor and the blade tip in the radial direction of the rotor, may be smaller than a rate of change of the twist angle in a region of the blade extending from the fourth position to a fifth position located between the rotation center of the rotor and the blade tip in the radial direction of the rotor, a distance between the rotation center of the rotor and the fourth position may be longer than a distance between the fourth position and the blade tip, the distance between the fourth position and the blade tip may be longer than a distance between the fifth position and the blade tip, and a distance between the rotation center of the rotor and the first position may be shorter than the distance between the rotation center of the rotor and the fourth position. According to this feature, the energy efficiency of the rotor can be improved.

In the above blade, a distance between the rotation center of the rotor and the first position may be longer than a distance between the first position and the blade tip. According to this feature, the energy efficiency of the rotor can be improved.

The rotor includes the above blade, and the blade comprises three or more blades. According to this feature, the energy efficiency of the rotor can be improved.

The rotor including the above blade may be provided in plurality and the plurality of rotors may be lined up in a front-rear direction of the fuselage (16) of the aircraft. According to this feature, the energy efficiency of the rotor can be improved.

According to the above rotor, the aircraft may include the fixed wing configured to generate lift, and rotation of the rotors may be stopped in a state where the lift is generated in the fixed wing. According to this feature, the energy efficiency of the rotor can be improved.

Note that the present invention is not limited to the above disclosure, and various modifications are possible without departing from the essence and gist of the present invention.

The invention claimed is:

1. A blade for use in a rotor of an aircraft, wherein
the blade is swept in a region of the blade extending to a blade tip from a first position located between a rotation center of the rotor and the blade tip in a radial direction of the rotor,
an amount of sweep of the blade increases from the first position toward the blade tip, a rate of change of the amount of sweep in a region of the blade extending to the blade tip from a second position located between the first position and the blade tip in the radial direction of the rotor is greater than a rate of change of the amount of sweep in a region of the blade extending from the first position to the second position, a twist angle of the blade continuously changes at least from a third position to the blade tip, the third position being located at a center between the rotation center of the rotor and the blade tip in the radial direction of the rotor, a rate of change of the twist angle in a region of the blade extending from a fourth position located between the rotation center of the rotor and the blade tip in the radial direction of the rotor, to a fifth position located between the rotation center of the rotor and the blade tip in the radial direction of the rotor, is greater than a rate of change of the twist angle in a region of the blade extending from the fifth position to the blade tip, a distance between the rotation center of the rotor and the fourth position is longer than a distance between the fourth position and the blade tip, the distance between the fourth position and the blade tip is longer than a distance between the fifth position and the blade tip, and the fifth position is a same position as the second position.

2. The blade according to claim 1, wherein
a rate of change of the twist angle in a region of the blade extending from the third position to the fourth position is smaller than the rate of change of the twist angle in the region of the blade extending from the fourth position to the fifth position, and
a distance between the rotation center of the rotor and the first position is shorter than the distance between the rotation center of the rotor and the fourth position.

3. The blade according to claim 1, wherein
a distance between the rotation center of the rotor and the first position is longer than a distance between the first position and the blade tip.

4. The blade according to claim 1, wherein
the blade has no forward-swept portion in a region from the rotation center of the rotor to the wing tip.

5. The blade according to claim 1, wherein
a distance between the rotation center of the rotor and the first position is shorter than the distance between the rotation center of the rotor and the fourth position.

6. A rotor comprising the blade according to claim 1, wherein
the blade is one of three or more blades.

7. An aircraft comprising a plurality of rotors, each of the rotors including the blade according to claim 1, wherein
the plurality of rotors are lined up in a front-rear direction of a fuselage of the aircraft.

8. The aircraft according to claim 7, wherein
the aircraft includes a fixed wing configured to generate lift, and
rotation of the plurality of rotors is stopped in a state where the lift is generated in the fixed wing.

9. A blade for use in a rotor of an aircraft, wherein
the blade is swept in a region of the blade extending to a blade tip from a first position located between a rotation center of the rotor and the blade tip in a radial direction of the rotor,
an amount of sweep of the blade increases from the first position toward the blade tip,
a rate of change of the amount of sweep in a region of the blade extending to the blade tip from a second position located between the first position and the blade tip in the radial direction of the rotor is greater than a rate of change of the amount of sweep in a region of the blade extending from the first position to the second position,
a twist angle of the blade changes at least from a third position toward the blade tip, the third position being located at a center between the rotation center of the rotor and the blade tip in the radial direction of the rotor,
a rate of change of the twist angle in a region of the blade extending from a fourth position located between the rotation center of the rotor and the blade tip in the radial direction of the rotor, to a fifth position located between the rotation center of the rotor and the blade tip in the radial direction of the rotor, is greater than a rate of change of the twist angle in a region of the blade extending from the fifth position to the blade tip,
a distance between the rotation center of the rotor and the fourth position is longer than a distance between the fourth position and the blade tip,
the distance between the fourth position and the blade tip is longer than a distance between the fifth position and the blade tip,
the fifth position is a same position as the second position, and
the blade has no forward-swept portion in a region from the rotation center of the rotor to the wing tip.

10. A blade for use in a rotor of an aircraft, wherein
the blade is swept in a region of the blade extending to a blade tip from a first position located between a rotation center of the rotor and the blade tip in a radial direction of the rotor,
an amount of sweep of the blade increases from the first position toward the blade tip,
a rate of change of the amount of sweep in a region of the blade extending to the blade tip from a second position located between the first position and the blade tip in the radial direction of the rotor is greater than a rate of change of the amount of sweep in a region of the blade extending from the first position to the second position,
a twist angle of the blade changes at least from a third position toward the blade tip, the third position being located at a center between the rotation center of the rotor and the blade tip in the radial direction of the rotor,
a rate of change of the twist angle in a region of the blade extending from a fourth position located between the rotation center of the rotor and the blade tip in the radial direction of the rotor, to a fifth position located between the rotation center of the rotor and the blade tip in the radial direction of the rotor, is greater than a rate of change of the twist angle in a region of the blade extending from the fifth position to the blade tip,
a distance between the rotation center of the rotor and the fourth position is longer than a distance between the fourth position and the blade tip,
the distance between the fourth position and the blade tip is longer than a distance between the fifth position and the blade tip,
the fifth position is a same position as the second position, and
a distance between the rotation center of the rotor and the first position is shorter than the distance between the rotation center of the rotor and the fourth position.

* * * * *